United States Patent
Fassbender et al.

(10) Patent No.: US 8,328,288 B2
(45) Date of Patent: Dec. 11, 2012

(54) DETENT FITTING FOR LOCKING TWO VEHICLE PARTS

(75) Inventors: Frank Fassbender, Coburg (DE); Oliver Steffen, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 351 days.

(21) Appl. No.: 12/782,672

(22) Filed: May 18, 2010

(65) Prior Publication Data

US 2010/0319482 A1    Dec. 23, 2010

(30) Foreign Application Priority Data

May 20, 2009    (DE) .......................... 10 2009 022 778

(51) Int. Cl.
A47C 31/00    (2006.01)
(52) U.S. Cl. .................................... 297/463.1
(58) Field of Classification Search ............... 297/367 P, 297/366, 463.1; 16/321, 327; 74/578
See application file for complete search history.

(56) References Cited

U.S. PATENT DOCUMENTS

| | | | | |
|---|---|---|---|---|
| 6,092,874 | A * | 7/2000 | Kojima et al. | 297/367 R |
| 6,095,608 | A * | 8/2000 | Ganot et al. | 297/367 R |
| 6,626,495 | B2 * | 9/2003 | Okazaki et al. | 297/367 R |
| 7,168,764 | B2 * | 1/2007 | Reubeuze et al. | 297/367 R |
| 7,334,843 | B2 * | 2/2008 | Yamada et al. | 297/367 R |
| 7,677,667 | B2 * | 3/2010 | Peters et al. | 297/367 R |

| | | |
|---|---|---|
| 2002/0171280 A1 | 11/2002 | Okazaki et al. |
| 2007/0132294 A1 | 6/2007 | Yamada et al. |
| 2009/0085391 A1 | 4/2009 | Peters et al. |

FOREIGN PATENT DOCUMENTS

| | | |
|---|---|---|
| DE | 102 27 752 A1 | 1/2004 |
| DE | 10 2006 000 523 A1 | 6/2007 |
| DE | 10 2006 015 560 B3 | 8/2007 |
| DE | 102 17 873 B4 | 8/2008 |
| DE | 20 2007 012 931 U1 | 10/2008 |

* cited by examiner

Primary Examiner — Milton Nelson, Jr.
(74) Attorney, Agent, or Firm — Christie, Parker & Hale, LLP (57) ABSTRACT

A detent fitting for locking two vehicle parts comprises a first vehicle part, a second vehicle part which is arranged pivotably about a rotational axis with respect to the first fitting part and three locking pawls which are arranged displaceably on the first fitting part, the locking pawls being designed and provided to be brought into engagement with a toothing of the second fitting part for locking the first fitting part with respect to the second fitting part and to be brought out of engagement with the toothing of the second fitting part for releasing the locking. Each locking pawl is associated with a free-pivoting section on the second fitting part, the locking pawl interacting with the free-pivoting section when turning the second fitting part relative to the first fitting part and the free-pivoting section being designed and provided to prevent an engagement of the locking pawl with the toothing of the second fitting part in a predefined angular range. According to the invention it is provided that at least one of the free-pivoting sections (62, 66, 72; 811, 821, 831) is displaced in the axial and/or radial direction with regard to the rotational axis (A) with respect to the other free-pivoting sections (62, 66, 72; 811, 821, 831). In this way a detent fitting comprising three locking pawls is provided which comprises a larger pivoting range.

20 Claims, 11 Drawing Sheets

FIG 11

DETENT FITTING FOR LOCKING TWO VEHICLE PARTS

CROSS-REFERENCE TO A RELATED APPLICATION

This application claims priority to and the benefit of German Patent Application Number 10 2009 022 778.4, filed on May 20, 2009, the entire content of which is incorporated herein by reference.

BACKGROUND

The invention relates to a detent fitting for locking two vehicle parts according to the preamble of claim 1.

A detent fitting of this kind comprises a first fitting part, a second fitting part mounted rotatably about a rotation axis with respect to the first fitting part and three locking pawls mounted movably on the first fitting part. The locking pawls are designed and provided to be brought into engagement with a toothing of the second fitting part for locking the first fitting part with the second fitting part and to be brought out of engagement with the toothing of the second fitting part for releasing the locking.

Such a detent fitting can for example serve, in a vehicle seat, for locking a backrest relative to a seat part and hold, in the locked state, the backrest in position with respect to the seat part. Through releasing the locking the backrest, then, is released such that the backrest can be moved with respect to the seat part to for example adjust the position of the backrest or to pivot the backrest forward and to thereby increase the loading space behind the backrest or to allow a passenger to enter a seat bench behind the backrest.

To pivot a backrest in a defined way into a fold-forward position usual detent fittings provide so called free-pivoting ranges in which the locking pawls of the detent fitting cannot come into engagement with the toothing on the second fitting part. For this, on the second fitting part free-pivoting sections are formed which each are associated with a locking pawl and cooperate, when turning the second fitting part relative to the first fitting part for example while pivoting a backrest, with the locking pawls in such a way that in the free-pivoting range (which corresponds to a predefined angular range on the pivoting path of the detent fitting) an engagement of the locking pawls with the toothing of the second fitting part is prevented.

In a detent fitting known from DE 10 2006 000 523 A1 three locking pawls mounted on a first fitting part cooperate with a guiding contour being formed in a second fitting part which comprises three free-pivoting sections protruding radially inwards. In that in the free-pivoting ranges protrusions mounted on the locking pawls enter the angular range of the free-pivoting sections, the locking pawls, in the free-pivoting ranges, are held in a position displaced radially inwards and in this way cannot come into engagement with a toothing on the second fitting part. In this way, a locking of the detent fitting is prevented in the free-pivoting ranges.

In a detent fitting comprising three locking pawls the three locking pawls are mounted equally spaced on the first fitting part and, consequently, are displaced with respect to each other by 120° about the rotational axis. If a guiding contour which extends about an angle and comprises a free-pivoting section is associated with each locking pawl, a pivoting range results which is limited in that the free-pivoting sections on the second fitting part must be periodically repeated. The pivoting range of the detent fitting that can be achieved, thus, is limited. In particular, the detent fitting can be pivoted by a maximum of 120° until the locking pawls run into the guiding contour of the respective adjoining locking pawl, because the guiding contours repeat themselves periodically with an angular distance of 120°.

Form DE 102 178 73 B4 a detent fitting is known in which only one of the three locking pawls is designed to cooperate with a free-pivoting section. No free-pivoting sections are associated with the other two locking pawls such that these, when pivoting the detent fitting, are not additionally prevented from lockingly engaging with the toothing of the second fitting part. In this way, on the one hand a larger pivoting range of the detent fitting can be achieved. At the same time, however, when pivoting the detent fitting there exists the risk that the locking pawls come into contact with the toothing of the second fitting part and, hence, prevent the pivoting or at least hinder it and, possibly, lead to a damaging of the detent fitting.

From DE 10 2006 015 560 B3 a detent fitting with four locking pawls is known, two of which interact with two guiding contours lying opposite to each other in a radially outer position and two of which interact with guiding contours lying opposite to each other in a radially inner position in a pairwise fashion for preventing an engagement in a pre-pivoting range. The constructive configuration of such a detent fitting comprising four locking pawls differs substantially from the one of a detent fitting comprising three locking pawls. In a detent fitting comprising three locking pawls a pairwise arrangement of locking pawls and a provision of guiding contours with free-pivoting sections lying opposite to each other is not possible.

SUMMARY

It is an object of the invention to provide a detent fitting comprising three locking pawls which comprises a larger pivoting range.

Herein, it is provided that at least one of the three pivoting sections is displaced in the axial and/or radial direction with respect to the rotational axis relative to the other free-pivoting sections.

In conventional detent fittings free-pivoting sections are arranged in an axial plane in the same radial position relative to the rotational axis. In turning away from this the instant invention provides to displace free-pivoting sections in the axial and/or radial direction with respect to each other such that the free-pivoting sections associated with the individual locking pawls no longer are arranged axially in the same plane or radially in the same position. Thereby, it becomes possible to arrange guiding contours—part of which are the free-pivoting sections and with which the locking pawls interact when pivoting the detent fitting—such that they overlap in their circumscribed angular range without the guiding contours of the individual locking pawls disturbing each other.

Each locking pawl may comprise a protrusion protruding in the axial direction which is designed and provided to interact with the associated free-pivoting section. The free-pivoting section is formed as a section which is displaced radially inwards with respect to at least a further section of a guiding contour being arranged on the second fitting part and serves, mechanically through interaction with the respective protrusion on the associated locking pawl in a predefined angular range (the free-pivoting range), for preventing that the locking pawl can be moved outwards and, in this way, can come into engagement with the toothing on the second fitting part. For example, the guiding contour can be formed in the shape of an oblong hole or a radially inner edge on the second fitting part. When pivoting the second fitting part relative to the first fitting part each locking pawl moves with the protruding protrusion along the guiding contour associated with it and comes into the angular range of the free-pivoting section corresponding to the free-pivoting range in which the locking pawl cannot be moved in a radially outer position and, in this way, cannot come into engagement with the toothing on the second fitting part. Through the interaction of the protrusions with the free-pivoting sections, thus, it is prevented that within the free-pivoting range the detent fitting can lock such that in this free-pivoting range a free, unhindered pivoting of the detent fitting is possible.

In that the free-pivoting sections and, hence, also the guiding contours are axially and/or radially displaced with respect to each other, it is achieved that a protrusion of a locking pawl cannot run into a guiding contour associated with another locking pawl. The guiding contours which define the pivoting path of the second fitting part relative to the first fitting part in the circumferential direction about the rotational axis may prescribe an angle larger than 120° without angularly overlapping in doing so.

The guiding contours associated with the locking pawls can be formed on an insert ring which is arranged on the second fitting part in a rotationally fixed manner. By using an insert ring a detent fitting can individually be adjusted in that, through a respectively used insert ring, the free-pivoting sections and the associated guiding contours are defined in a suitable manner and are adjusted for the application of the detent fitting (for example for a particular vehicle seat of a vehicle). Detent fittings, thus, can be designed substantially identical in construction and can be adapted by using different insert rings for different applications. To define guiding contours in axially different planes, herein, also multiple, for example two or three insert rings being axially displaced with respect to each other, can be used.

It also is conceivable to form the guiding contours in one piece on the second fitting part. Oblong holes or edges forming the guiding contours can herein be formed in a base plate of the second fitting part, wherein it is also possible to form guiding contours in an axial plane on the second fitting part and to use, in addition, one or multiple insert rings for defining guiding contours in further axial planes. In an embodiment of the detent fitting the free-pivoting sections associated with the locking pawls all are displaced with respect to each other in the radial direction with regard to the rotational axis. The free-pivoting sections and, thus, also the associated guiding contours are situated in radially different positions, whereby it becomes possible that the guiding contours can overlap each other angularly without a locking pawl, during pivoting, running into the guiding contour of another locking pawl.

In a corresponding manner, therein, also the protrusions being arranged on the locking pawls are radially displaced with respect to each other for interacting with the radially displaced free-pivoting sections.

In a further embodiment the free-pivoting sections associated with the locking pawls are displaced with respect to each other in the axial direction relative to the rotational axis. The free-pivoting sections and the corresponding guiding contours are located in axially different planes. In that the protrusions of the locking pawls are formed such that they can interact only with the guiding contour and the free-pivoting section in a single axial plane, it is prevented that the guiding contours disturb each other. In this way it becomes possible that the guiding contours can angularly overlap if the individual guiding contours each describe an angle larger than 120°.

In a further embodiment two free-pivoting sections are arranged in the same axial plane and the same radial position, whereas a third free-pivoting section is displaced in the radial direction with regard to the two other free-pivoting sections. It also is possible to displace the third free-pivoting section in the radial and the axial direction or only in the axial direction with regard to the other two free-pivoting sections. Two of the three free-pivoting sections, hence, are not displaced in the axial or radial direction with respect to each other. The third free-pivoting section, however, is displaced axially and/or radially with respect to these two first free-pivoting sections, whereby it becomes possible that the guiding contours each can describe an angle of larger than 120°. The guiding contours of the two first free-pivoting sections, thus, do not overlap, but are arranged one after the other in the circumferential direction (the radially extending middle lines of the associated free-pivoting sections comprise an angular distance of larger than 120°), whereas the guiding contour associated with the third locking pawl angularly overlaps with the two other guiding contours, however is radially and/or axially displaced with respect to the two first guiding contours and, hence, is spatially separated from these.

To allow the two locking pawls associated with the two free-pivoting sections not being displaced with respect to each other to interact with the free-pivoting sections and the associated guiding contours, these each comprise a protrusion which comprise in the circumferential direction an angular distance about the rotational axis larger than 120°. This is based on the fact that, if two free-pivoting sections are located in the same axial plane and the same radial position and comprise an angular distance between their radial middle lines larger than 120°, the protrusions on the locking pawls must comprise a corresponding angular distance larger than 120° for the protrusions to be able to interact with the in each case associated free-pivoting sections.

If the locking pawls are arranged on the first fitting part with equal angular distance in the circumferential direction about the rotational axis with respect to each other, the protrusions of the two locking pawls which are associated with the free-pivoting sections not being axially and radially displaced to each other are arranged on the locking pawls offset by an angle about the rotational axis relative to radially extending middle lines of the locking pawls to achieve an angular distance larger than 120° between the protrusions. The protrusions, thus, are not located on the radial middle lines of the locking pawls, but are arranged offset towards the outer edge to the right, respectively to the left of the middle line of the respective locking pawl.

To achieve an angular distance larger than 120° between the protrusions it also is conceivable to arrange the locking pawls on the first fitting part in an unequally spaced manner in the circumferential direction about the rotational axis, wherein the locking pawls which are associated with the free-pivoting sections not being axially and radially displaced to each other comprise an angular distance in the circumferential direction about the rotational axis larger than 120°, measured between the radially extending middle lines of the locking pawls. The protrusions are arranged, then, in each case on the middle line of the locking pawls.

Different possibilities are conceivable for designing the protrusions on the locking pawls for interacting with the free-pivoting sections and the associated guiding contours. First, in each case a protrusion can be integrally formed on a base body of each locking pawl. In a refinement advantageously, however, for forming a protrusion a modular element may be used which is arranged on the base body of a locking pawl. For each locking pawl the same base body may be used, wherein in dependence on the desired position and design of the protrusion the modular element can be exchanged. The modular element can for example be formed as a force-fitting part which is force-fitted into a cut-out on the base body of the locking pawl and can be made out of metal.

In an advantageous embodiment it also is possible to form the modular element such that it is connectable with the base body in different orientations to form different protrusions on the locking pawl. This has the further advantage that the same modular element can be used for forming different protrusions. In dependence on the orientation and the arrangement of the modular element on the base body of the locking pawl, then, protrusions result which are displaced to each other in a suitable manner.

Possibly it also is conceivable to arrange a pin on a base body of the locking pawl in a displaced manner with respect to the middle line to form different protrusions. The pin can protrude to both sides of the locking pawl, wherein the locking pawl can be reversed to obtain a protrusion to the left or to the right of the middle line. This, at the same time requires a recess in the region of the locking pawl on the first fitting part, but allows for using locking pawls of identical construction for a protrusion to the left and to the right of the middle line.

Alternatively, the pin can also be arranged in a displaceable manner on the locking pawl. The pin, herein, protrudes in one position to one side of the locking pawl and forms a protrusion to the left or to the right of the middle line. To obtain a protrusion on the other side of the middle line the locking pawl is reversed and the pin is pushed through the locking pawl. A recess on the first fitting part is not required.

BRIEF DESCRIPTION OF THE DRAWINGS

The idea underlying the invention shall subsequently be explained in more detail according to the embodiments shown in the figures. Herein.

DETAILED DESCRIPTION

Figure 1:
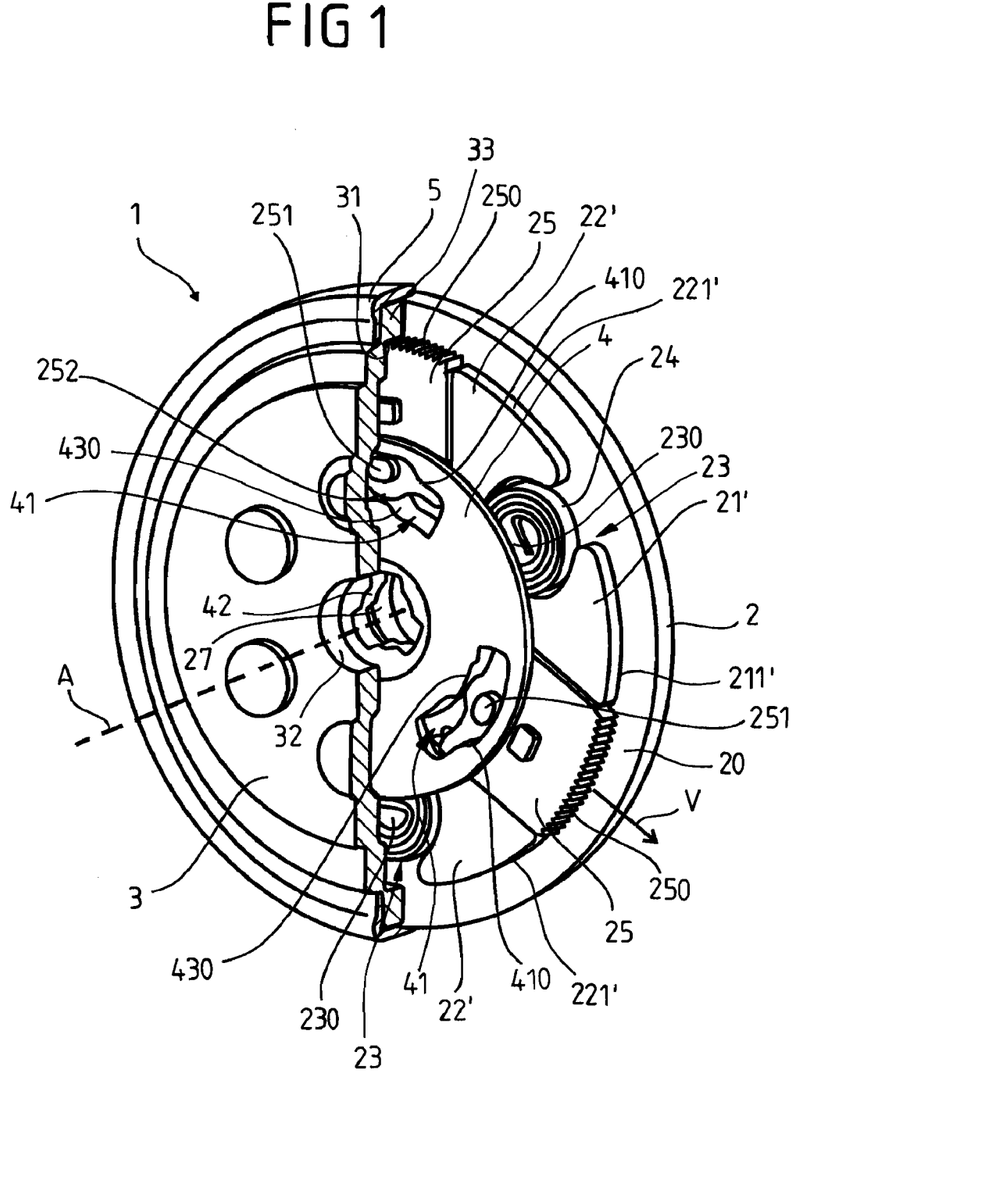
FIG. 1 shows a perspective partially cut view of a detent fitting.

FIG. 1 shows in a partially cut, perspective view an embodiment of a detent fitting 1 which can be used for example in a seat adjustment for adjusting the inclination of a backrest of a vehicle seat. Detent fittings 1 of identical construction, herein, are arranged on both sides of the backrest axially displaced to each other along a pivot axis of the backrest and are connected with each other via a drive axis extending along a rotational axis A. The detent fittings 1 serve for locking the backrest relative to a seat part of the vehicle seat and hold the backrest in position with regard to the seat part. Using an actuation lever the drive axis connecting the detent fittings 1 to each other can be actuated, thereby the locking of the detent fittings 1 can be released and the backrest can be adjusted.

The detent fitting 1 shown in FIG. 1 comprises a first fitting part 2 which is connected—via a holding ring 5 arranged on the first fitting part 2 in a clamped fashion—with a second fitting part 3 in a pivotable manner about the rotational axis A. When used for locking a backrest the first fitting part 2 may for example be connected with the seat part and the second fitting part 3 may be connected with the backrest, wherein the pivot axis between the backrest and the seat part corresponds to the rotational axis A of the detent fitting 1.

For the locking three locking pawls 25 being displaced about the rotational axis A by 120° to each other are arranged on the first fitting part 2, the locking pawls 25 being mounted, via guiding elements 21', 22', displaceably in a radial adjustment direction V on the first fitting part 2 and, for locking the detent fitting 1, being capable to be brought in engagement via an outer toothing 250 with a toothing 31 formed as an inner toothing on a ring-shaped section 33 of the second fitting part 3.

In the state shown in FIG. 1 the locking pawls 25 are situated in a position radially displaced outwards in which they engage with their toothing 250 in the toothing 31 of the second fitting part 3. In this state the detent fitting 1 is locked such that the first fitting part 2 cannot be pivoted relative to the second fitting part 3.

In the embodiment according to FIG. 1 the guiding elements 21', 22' guiding the locking pawls 25 in the radial direction are formed as projecting sections protruding in the direction of the second fitting part 3 from a disc-shaped base body 20 and serve on the one hand for the radial guiding of the locking pawls 25 and on the other hand as a bearing of the first fitting part 2 on the second fitting part 3. For this, the guiding elements 21', 22' abut with their outer sections 211', 221' in a sliding manner on the toothing 31 being formed as an inner toothing of the second fitting part 3 such that the first fitting part 2 is pivotable about the rotational axis A relative to the second fitting part 3.

The locking of the detent fitting 1 is achieved via the locking pawls 25 which in their locked state engage via the toothings 250 with the toothing 31 of the second fitting part 3. The actuation of the locking pawls 25 for locking the detent fitting 1 or for releasing the locking herein takes place via a drive element 4 being arranged between the first fitting part 2 and the second fitting part 3, the drive element being formed in a disc-shaped manner and comprising a central receiving opening 42 for receiving a drive axis extending through the fitting parts 2, 3 at cut-outs 27, 32.

Oblong holes 41 are formed on the drive element 4 which are identical in construction and are displaced to each other about the rotational axis A by 120°, one actuation element 251 of a locking pawl 25 each respectively engaging into the oblong holes 41. The actuation element 251 in each case is in contact with an outer hole section 410 of the oblong hole 41 and slides, when turning the drive element 4 about the rotational axis A, along the outer hole section 410.

Furthermore, a projecting, protrudingly formed actuation disc is arranged on the back side of the drive element 4, the actuation disc forming on its outer circumference a guiding section 430 which is in contact with the locking pawls 25 mounted on the first fitting part 2 via a cam 252 being formed on each lower end of the locking pawls 25.

In a locked state in which the locking pawls 25 are displaced radially outwards and via their toothing 250 are in engagement with the toothing 31 of the second fitting part 3 the actuation element 251 of the locking pawls 25 in each case is in contact with a section of the outer hole section 410 being displaced radially outwards, and at the same time the cam 252 of the locking pawls 25 in each case abuts on a section of the guiding section 430 equally being displaced radially outwards. Via the drive element 4 the locking pawls 25 hence are held in engagement with the toothing 31 of the second fitting part 3.

For actuating the locking pawls 25 the drive element 4 is pivoted about the rotational axis A—in the view according to FIG. 1 in the counter-clockwise direction. In doing so the actuation element 251 of each locking pawl 25 slides along the outer hole section 410 of the in each case associated oblong hole 41, and the cam 252 formed on the lower end of the locking pawl 25 slides along the guiding section 430 until the actuation element 251 comes into contact with a section of the outer hole section 410 being displaced radially inwards and the cam 252 comes into contact with a section of the guiding section 430 being displaced radially inwards and, thus, the locking pawl 25 is moved radially inwards. In this unlocked state the locking pawls 25 are no longer in engagement with the toothing 31 of the second fitting part 3 such that the first fitting part 2 is unlocked from the second fitting part 3 and may be pivoted about the rotational axis A relative to the second fitting part 3.

As shown in FIG. 1, spring elements 24 are arranged in receptacles 23 on the first fitting part 2 and are held via holding elements 230 on the first fitting part 2. The spring elements 24 tension the drive element 4 relative to the first fitting part 2 in the direction of the locked state according to FIG. 1 such that the detent fitting 1, if the drive element 4 is not actuated, holds the locking pawls 25 in the locked position and the first fitting part 2 is locked relative to the second fitting part 3.

Figure 2:
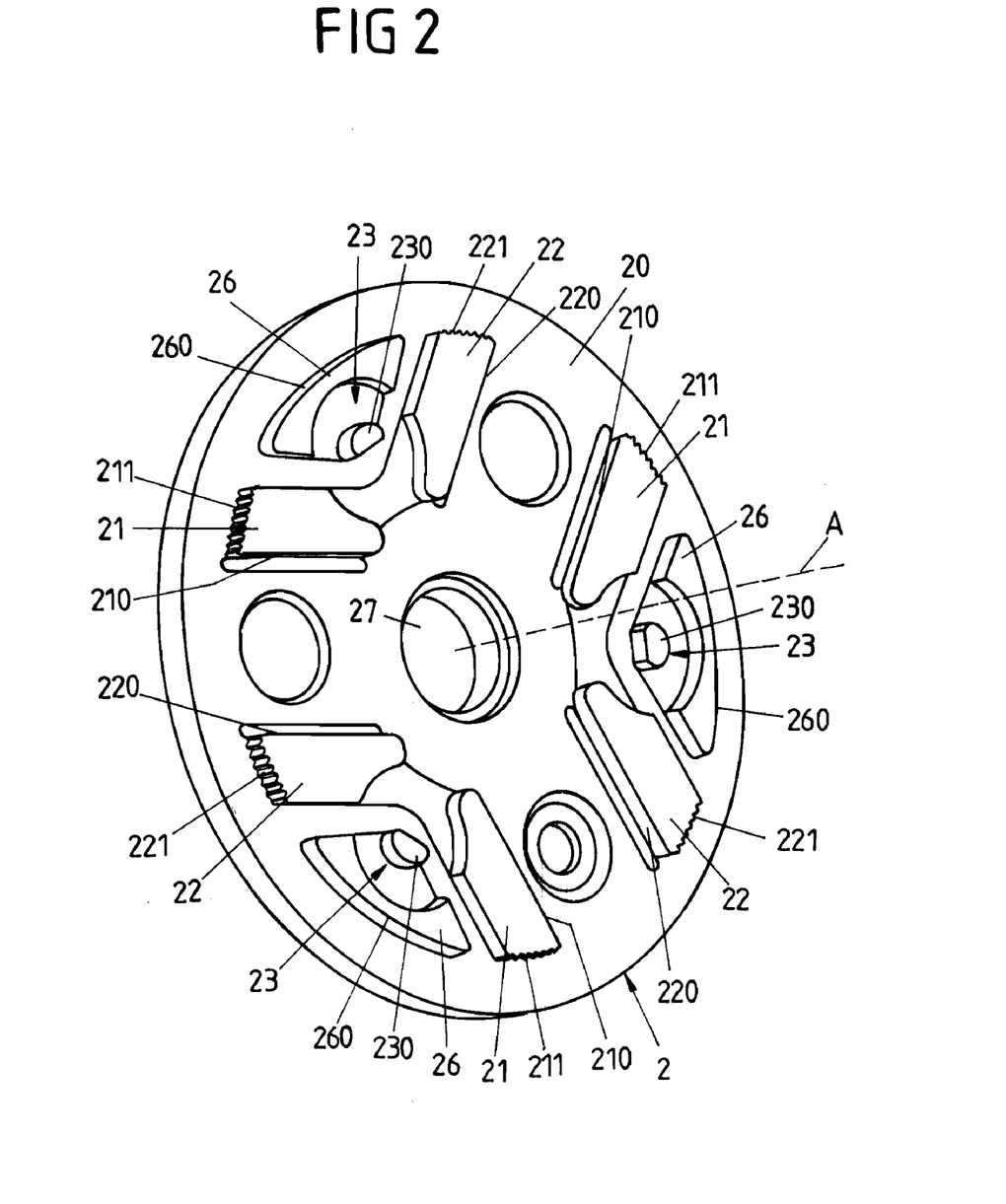
FIG. 2 shows a perspective view of an embodiment of a first fitting part of a detent fitting with guiding elements and bearing elements arranged thereon.

FIG. 2 shows, in a perspective view, an embodiment of the first fitting part 2 in which guiding elements 21, 22 for guiding each a locking pawl 25 (not shown in FIG. 2) and bearing elements 26 being formed separately from the guiding elements 21, 22 are provided. Except for the design of the first fitting part 2 the construction and function of the detent fitting using this modified first fitting part 2 correspond to the detent fitting 1 that is shown in FIG. 1 and that has been explained previously.

The guiding elements 21, 22 in each case form pawl guiding sections 210, 220 which run parallel to each other in a pairwise manner and between which the locking pawls are guided. The first fitting part 2 is formed for receiving altogether three locking pawls such that the first fitting part 2 altogether comprises six guiding elements 21, 22. The guiding elements 21, 22 are formed on a disc-shaped base body 20 of the first fitting part 2 as projecting sections protruding in the axial direction. Spatially separated and formed as separate projecting sections, three bearing elements 26 are provided which are displaced to each other by 120° and each comprise an outer bent bearing section 260 which in the assembled detent fitting 1 (see FIG. 1) slidingly abuts on the toothing 31 of the second fitting part 3. Via the bearing element 26 the first fitting part 2 is pivotably mounted about the rotation axis A relative to the second fitting part 3 and may, if the locking pawls are not in engagement with the toothing 31 of the second fitting part 3, be pivoted relative to the second fitting part 3.

In the embodiment according to FIG. 2, toothings 211, 221 are formed in each case on outer sections of the guiding elements 21, 22 which point towards the toothing 31 of the second fitting part 3. In the normal operation mode of the detent fitting 1 these toothings 211, 221 are not in engagement with the toothing 31 of the second fitting part 3, but can come into engagement with the toothing 31 of the second fitting part for providing an additional support in case of a load resulting from an accident.

Figure 3:
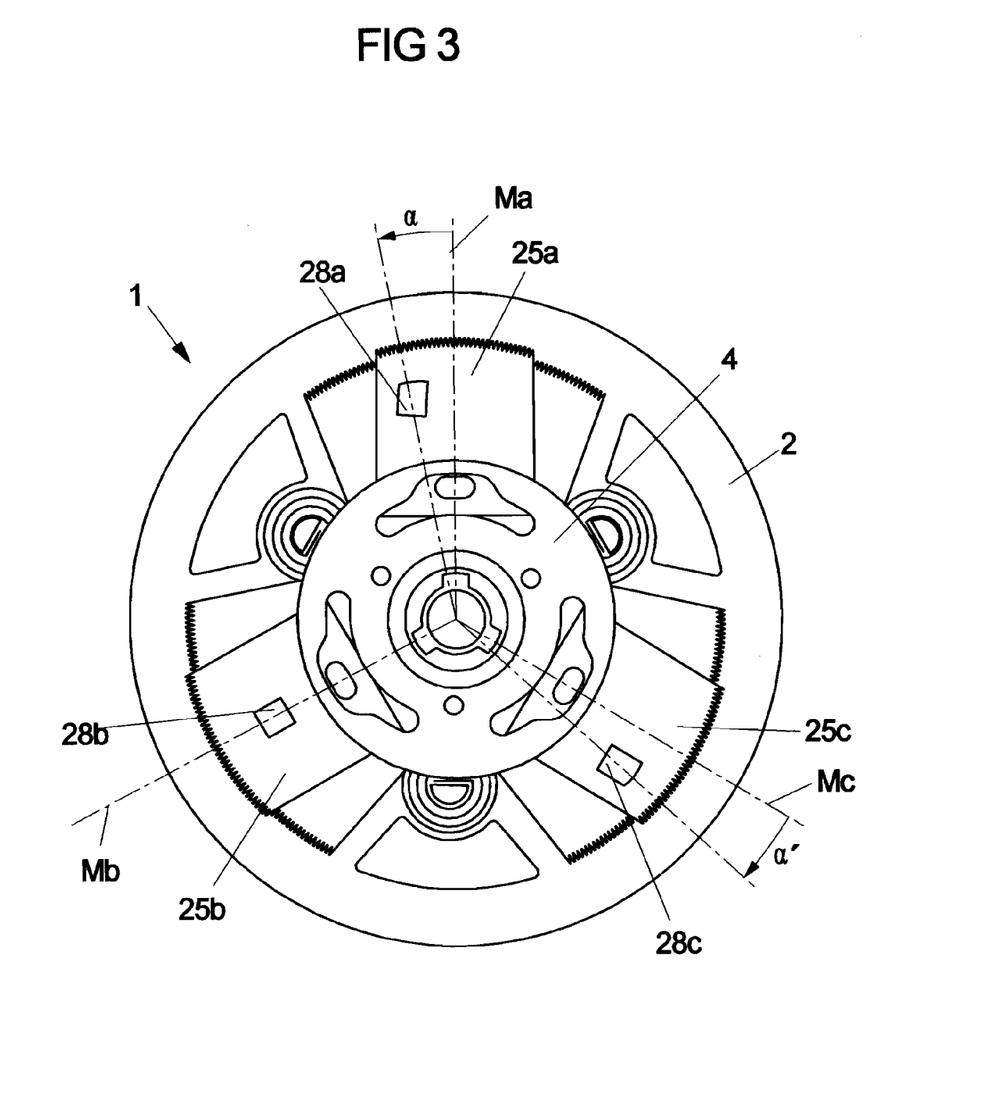
FIG. 3 shows a top view of locking pawls arranged on the first fitting part according to FIG. 2.

In FIG. 3 the first fitting part 2 according to FIG. 2 is shown with locking pawls 25*a*, 25*b*, 25*c* arranged thereon. In this embodiment the locking pawls 25*a*, 25*b*, 25*c* are arranged on the first fitting part in an equally spaced manner and pairwise comprise angular distances between their radial middle lines Ma, Mb, Mc of in each case 120°.

Figure 4:
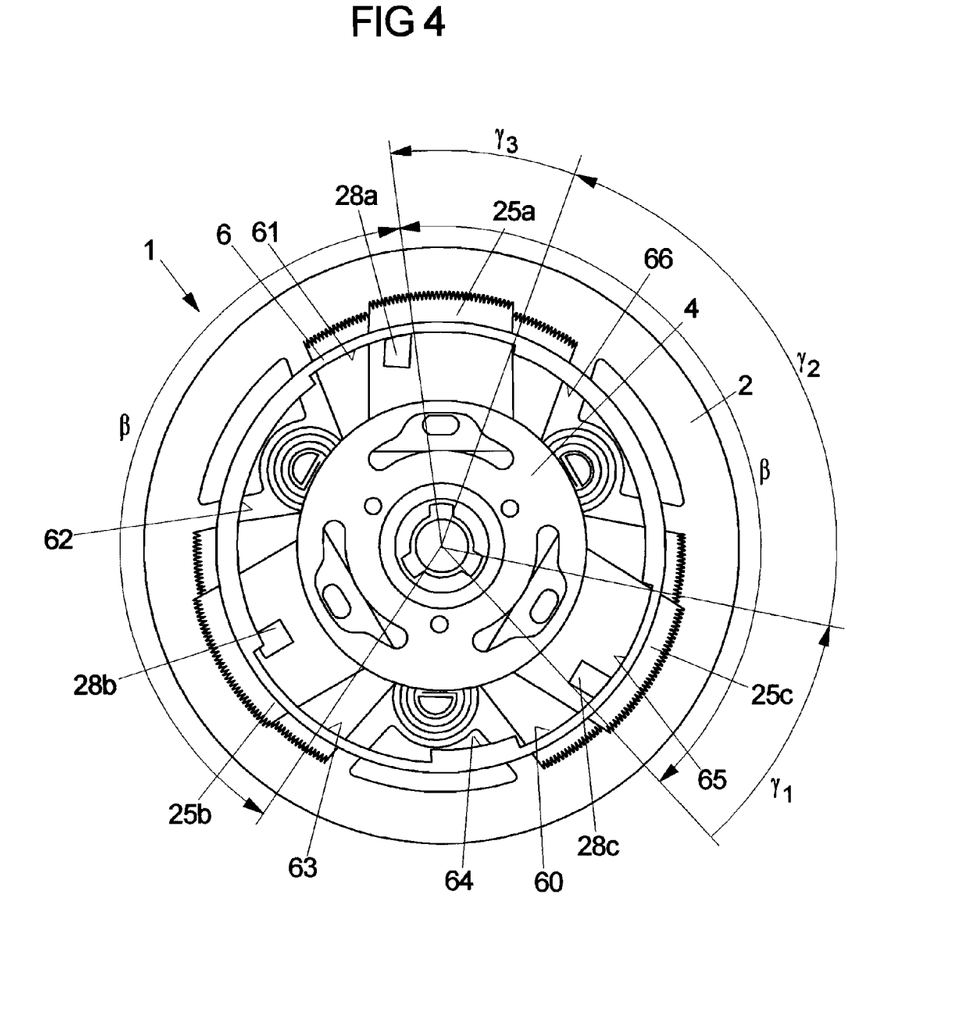
FIG. 4 shows a top view of the arrangement according to FIG. 3, additionally showing a first insert ring interacting with protrusions of two locking pawls.
Figure 5:
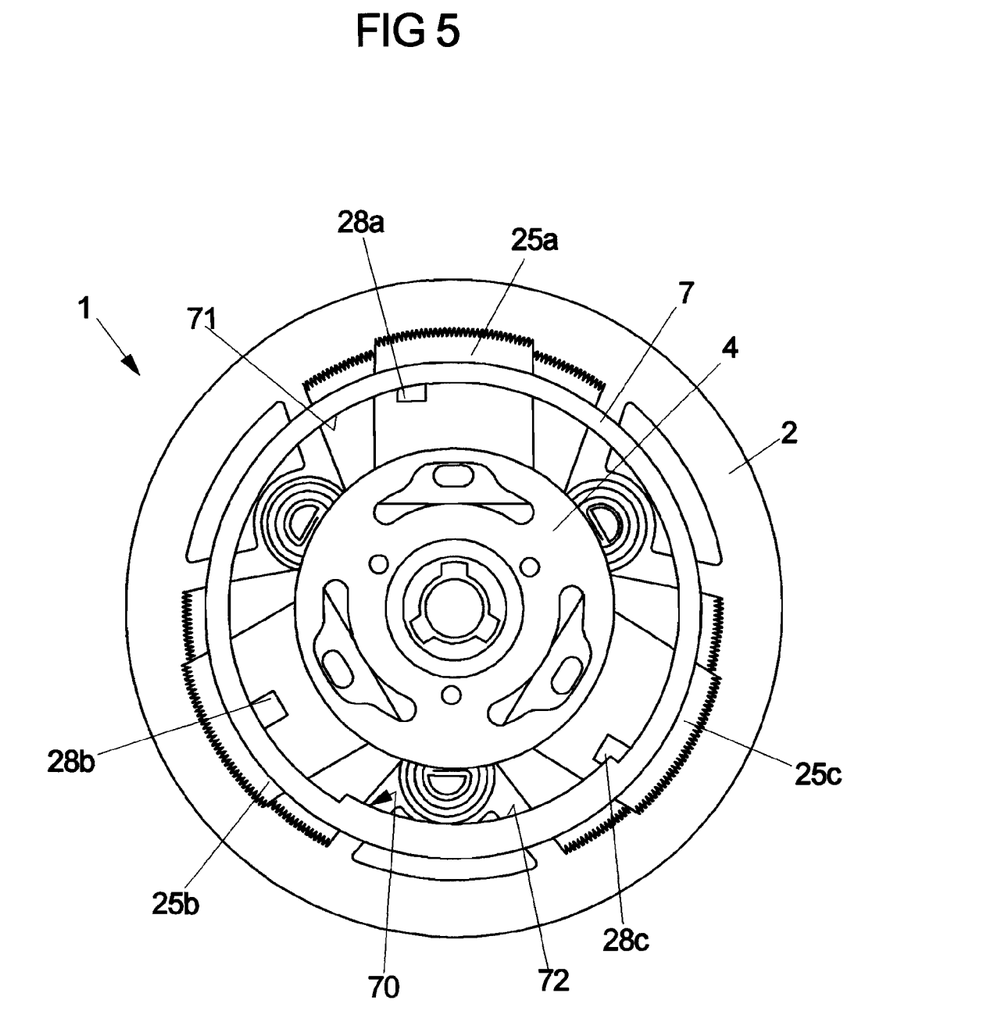
FIG. 5 shows a top view of the arrangement according to FIG. 3, additionally showing a second insert ring interacting with a protrusion of a third locking pawl and being axially displaced.

On the locking pawls 25*a*, 25*b*, 25*c* each a protrusion 28*a*, 28*b*, 28*c* is formed to interact with insert rings 6, 7 which are shown in FIGS. 4 and 5 and are axially displaced with respect to each other.

The insert rings 6, 7 according to FIGS. 4 and 5 are in each case arranged in a rotationally fixed manner on the second fitting part 3 (see FIG. 1) and, for this, can be inserted into the ring-shaped section 33 of the second fitting part 3.

The insert rings 6, 7 define control planes that are axially displaced to each other and comprise guiding contours which each are formed through the radial inner edge 60, 70 of the insert rings 6, 7. The guiding contours, herein, are defined through sections 61, 63, 65 and free-pivoting sections 62, 66 projecting radially inwards (insert ring 6) respectively the section 71 and the free-pivoting section 72 projecting radially inwards (insert ring 7). The free-pivoting sections 62, 66, 72 are formed to interact with the protrusions 28*a*, 28*b*, 28*c*, wherein the locking pawls 28*a*, 28*b*, 28*c*—in that the free-pivoting sections 62, 66, 72 are displaced relative to the sections 61, 63, 65 respectively 71 radially inwards—cannot be moved into a radially outer position when the protrusions 28*a*, 28*b*, 28*c* each are situated in the angular range of one of the free-pivoting sections 62, 66, 72 and therefore the locking pawls 25*a*, 25*b*, 25*c* cannot come into engagement with the toothing 31 of the second fitting part 3.

The free-pivoting sections 28*a*, 28*b*, 28*c*, thus, define a free-pivoting range corresponding to an angular range γ2 (FIG. 4) in which a locking of the detent fitting 1 is not possible and the second fitting part 3 can be pivoted relative to the first fitting part 2 in an unhindered manner. If the protrusions 28*a*, 28*b*, 28*c* are each situated in the angular range of one of the free-pivoting sections 62, 66, 72 and the drive element 4 is no (longer) actuated (because for example an actuation lever is released), the protrusions 28*a*, 28*b*, 28*c* each come into contact with one of the free-pivoting sections 62, 66, 72, without however locking the detent fitting 1.

As is shown in FIG. 3, the protrusion 28b is arranged on the middle line Mb of the locking pawl 25b. The protrusions 28a, 28b of the locking pawls 25a, 25c, in contrast, each are displaced by an angle α respectively by an opposite angle α' relative to the middle line Ma, Mc of the locking pawls 25a, 25c such that an angular distance between the protrusions 28a, 28c larger than 120°, namely 120°+2α, results.

Figure 6A:
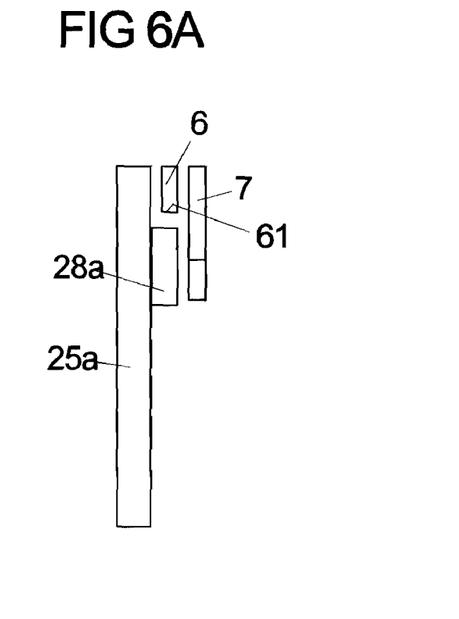
FIG. 6A, 6B show sectional views through a locking pawl which interacts with the first insert ring according to FIG. 4.
Figure 6B:
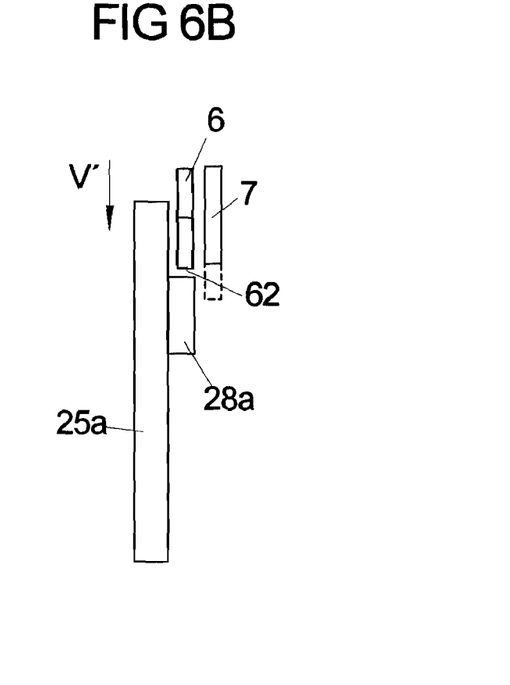
Figure 6C:
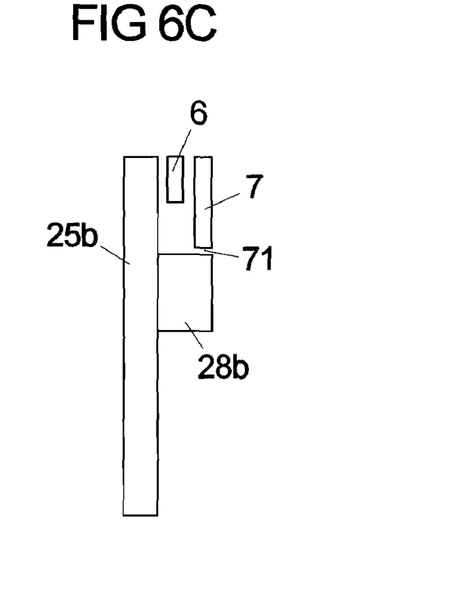
FIG. 6C, 6D show sectional views through a locking pawl which interacts with the second insert ring according to FIG. 5.
Figure 6D:
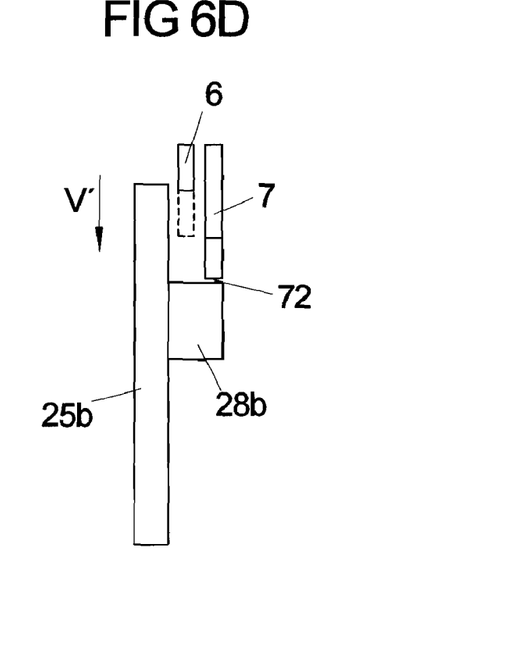
Figure 7A:
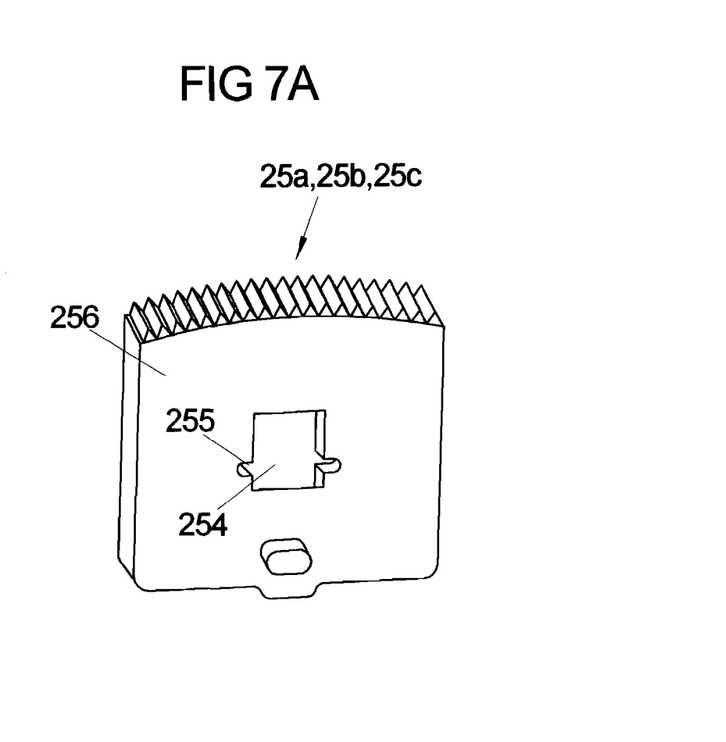
FIG. 7A shows a perspective view of a base body of a locking pawl.
Figure 7B:
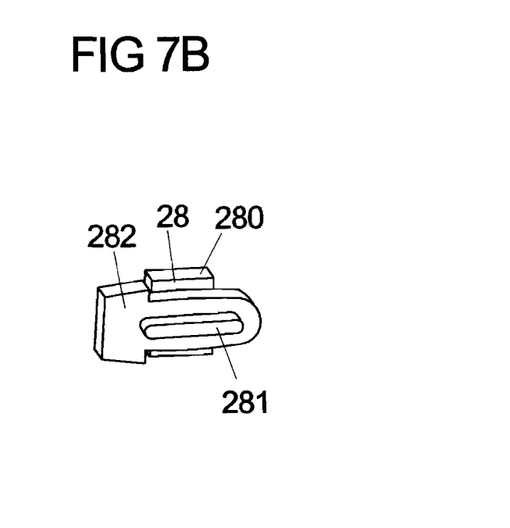
FIG. 7B, 7C show views of a modular element to be connected with the base body according to FIG. 7A.
Figure 7C:
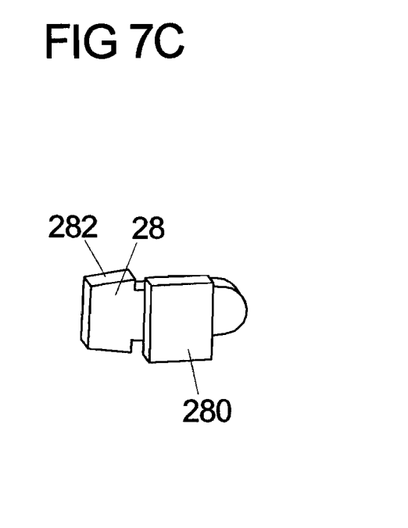

The protrusion 28b is formed to interact with the insert ring 7 of the axially displaced control plane according to FIG. 5. The protrusions 28a, 28c, in contrast, interact with the insert ring 6 of the axial control plane according to FIG. 4. For this, the protrusion 28a (and accordingly also the protrusion 28c) is, as shown in FIGS. 6A and 6B, formed in such a way that it can interact only with the insert ring 6 (which is arranged adjacent to the axial plane of the locking pawls 25a, 25b, 25c). The protrusion 28b of the locking pawl 25b, in contrast, is arranged on the locking pawl 25b in a manner displaced radially inwards relative to the protrusions 28a, 28c, as shown in FIGS. 6C and 6D, and can interact only with the insert ring 7 in that the section 71 of the insert ring 7 is arranged on a position being located radially further inwards relative to the sections 61, 63, 65 of the insert ring 6 and, just as well, the free-pivoting section 72 of the insert ring 7 is arranged on a position being situated radially further inwards relative to the free-pivoting sections 62, 66 of the insert ring 6.

The insert rings 6, 7 define guiding contours in axially different planes which at the same time are radially displaced to each other. The free-pivoting sections 62, 66 of the insert ring 6, herein, are located in the same axial plane in the same radial position and, hence, are not displaced radially and axially with respect to each other. The free-pivoting section 72 of the insert ring 7, in contrast, is both axially and radially displaced with regard to the free-pivoting sections 62, 66 of the insert ring 6.

In this way, a pivoting range β (FIG. 4) for the detent fitting 1 is achieved which describes an angle larger than 120° (which, namely, according to the angular distance between the protrusions 28a, 28c amounts to 120°+2α). Within this pivoting range β the protrusions 28a, 28c can move along the insert ring 6 without moving into the range of the guiding contour of the in each case other protrusion 28a, 28c. The free-pivoting section 72 is located axially and radially in a different position such that the protrusion 28b cannot interact with the insert ring 6.

In FIGS. 4 and 5 the detent fitting 1 is shown in a locked position which corresponds to a starting position for example for a vertically arranged backrest. From this position the first fitting part 2 can, when releasing the locking relative to the second fitting part 3, be pivoted in the counter clockwise direction, whereby the protrusions 28a, 28b, 28c of the locking pawls 25a, 25b, 25c move along the insert ring 6 respectively the insert ring 7 in the counter clockwise direction. After pivoting the first fitting part 2 about a relatively small angle γ1 (see FIG. 4) the protrusion 28a enters the angular range of the free-pivoting section 62, the protrusion 28b enters into the angular range of the free-pivoting section 72 and the protrusion 28c enters into the angular range of the free-pivoting section 66. Within the angle γ2 describing the free-pivoting range (see FIG. 4) the locking pawls 25a, 25b, 25c cannot come into engagement with the toothing 31 of the second fitting part 3. Within the range of the angle γ2, hence, a locking of the detent fitting 1 is not possible. Only after leaving the range of the angle γ2 when pivoting the detent fitting 1 further, the protrusions 28a, 28b, 28c enter the range of the sections 63, 71, 61 of the insert ring 6 respectively the insert ring 7 and, hence, are outside of the range of the free-pivoting sections 62, 66, 72. In the range of the angle γ3 a locking of the detent fitting 1 again is possible.

FIG. 7A to 7C and FIG. 8A to 8C show an embodiment of the locking pawls 25a, 25b, 25c with a base body 256 on which a modular element 28 each is mounted for forming the protrusions 28a, 28b, 28c. The modular element 28 (FIG. 7B, 7C) comprises sections 280, 281, 282 which serve on the one hand for a force-fitting connection with the base body 256 and on the other hand—dependent on the orientation of the modular element 28 on the base body 256—for forming the protrusions 28a, 28b, 28c.

Figure 8A:
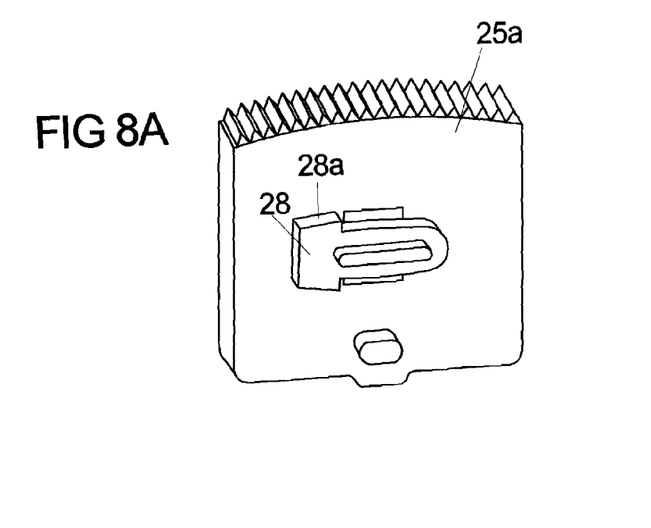
FIG. 8A-8C show views of three locking pawls with modular elements arranged on the base body according to FIG. 7A and being oriented differently, the modular elements forming different protrusions.
Figure 8B:
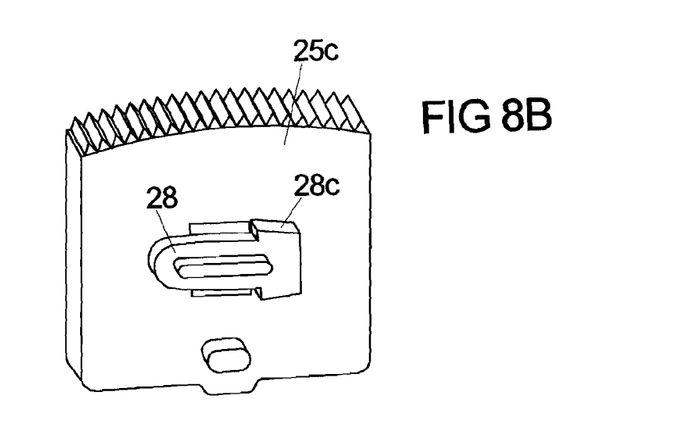
Figure 8C:
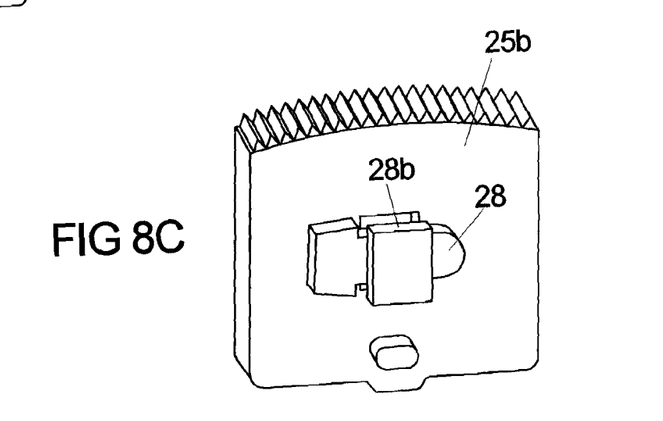

For connecting the modular element 28 with the base body 256 the base body 256 comprises a recess 254 in which the section 280 of the modular element 28 can be pressed. The recess 254 comprises in addition lateral indentations 255 which are formed for receiving the section 281 of the modular element 28. Via the recess 254 and the indentations 255 it is possible to connect the modular element 28 in different orientations with the base body 256, namely, as shown in FIG. 8A to 8C, through force-fitting the section 280 for forming a left-sided or a right-sided protrusion 28a, 28c (FIG. 8A, 8B; the protrusions are in each case formed through the section 282 of the modular element 28) or through force-fitting the section 281 in the indentations 255 for forming a central protrusion 28b (FIG. 8C; the protrusion is formed through the section 280 of the modular element 28).

Figure 9:
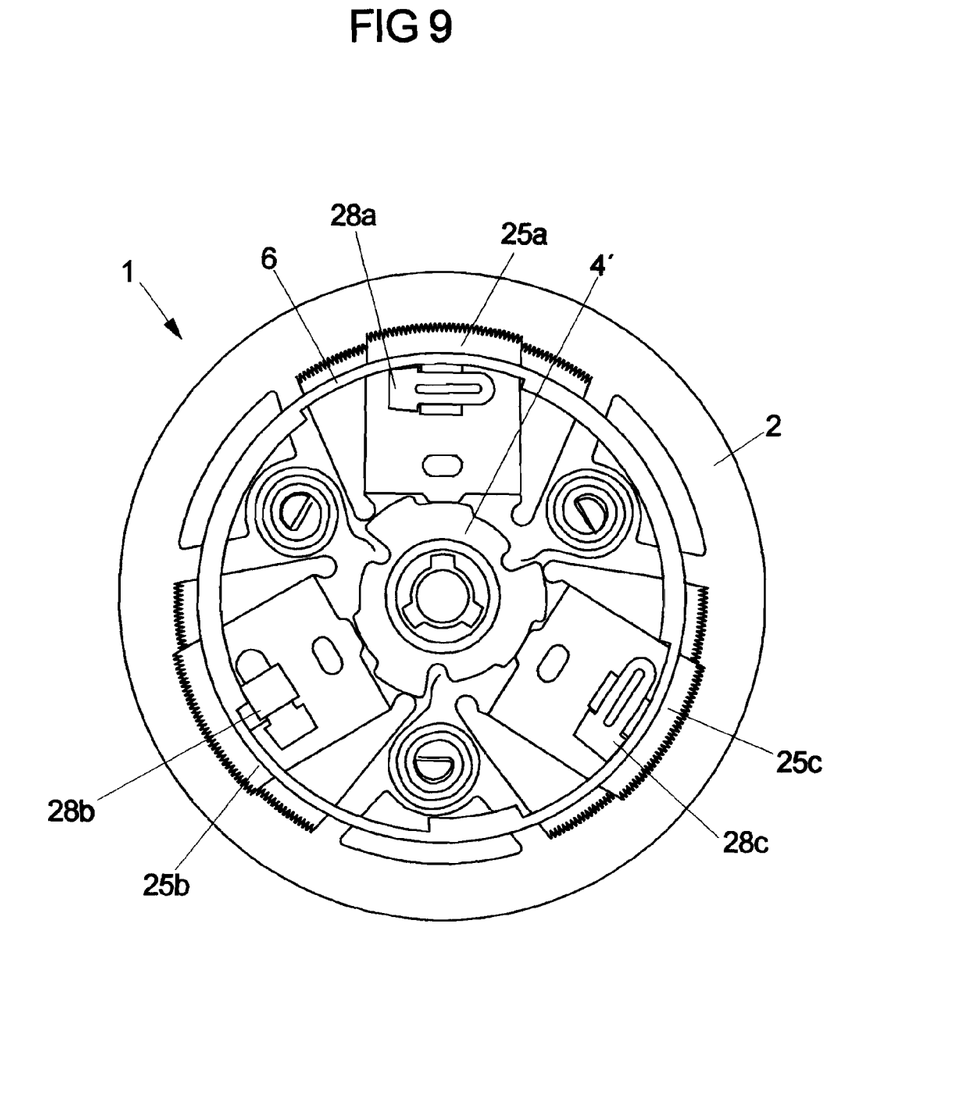
FIG. 9 shows a view of locking pawls arranged on the first fitting part according to FIG. 2 and being formed according to FIG. 8A-8C, additionally showing a first insert ring interacting with protrusions of two locking pawls.
Figure 10:
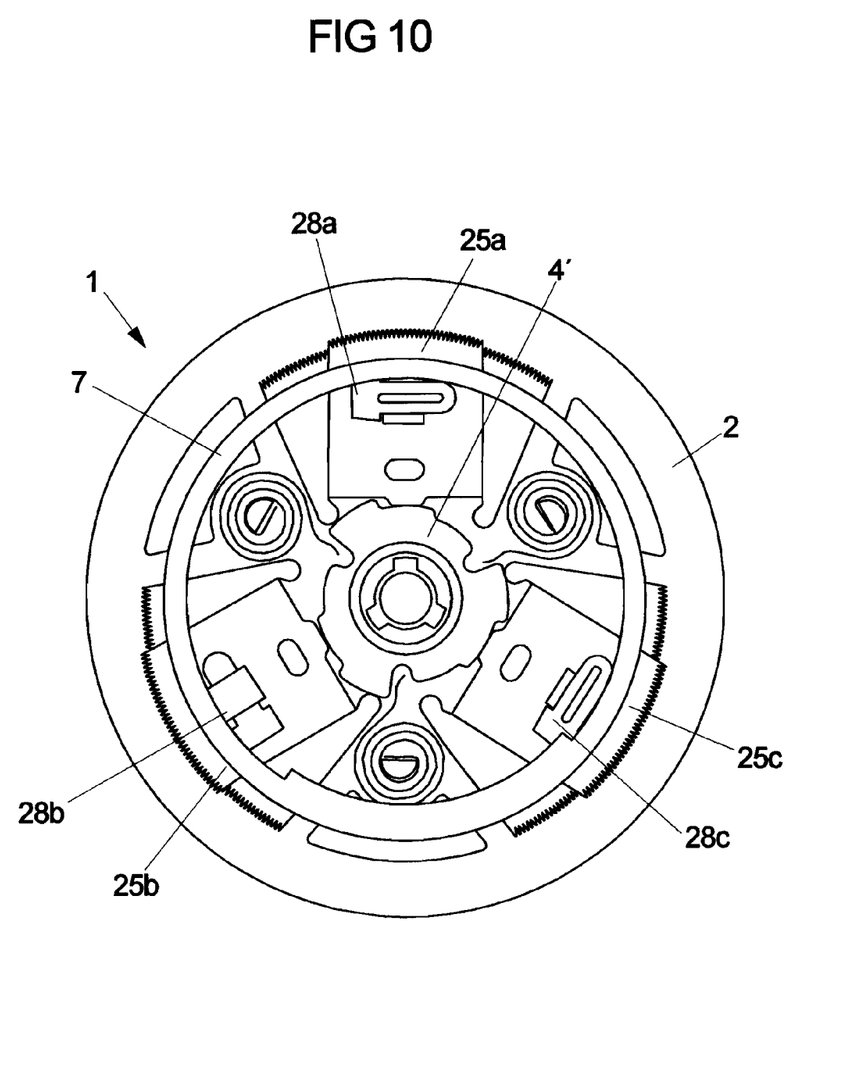
FIG. 10 shows a view of locking pawls arranged on the first fitting part according to FIG. 2 and being formed according to FIG. 8A-8C, additionally showing a second insert ring interacting with the protrusion of the third locking pawl and being axially displaced.

In FIG. 9 and FIG. 10 the locking pawls 25a, 25b, 25c formed in this way are shown in the state arranged on the first fitting part 2 in interaction with the insert ring 6 of the first control plane (FIG. 9) and the insert ring 7 of the axially displaced second control plane (FIG. 10). The mode of operation is analogously as explained according to FIGS. 3 to 6.

FIGS. 9 and 10, in addition, show the actuation disc 4' connected with the drive element 4 (FIG. 1) which for the actuation interacts with the locking pawls 25a, 25b, 25c.

Figure 11:
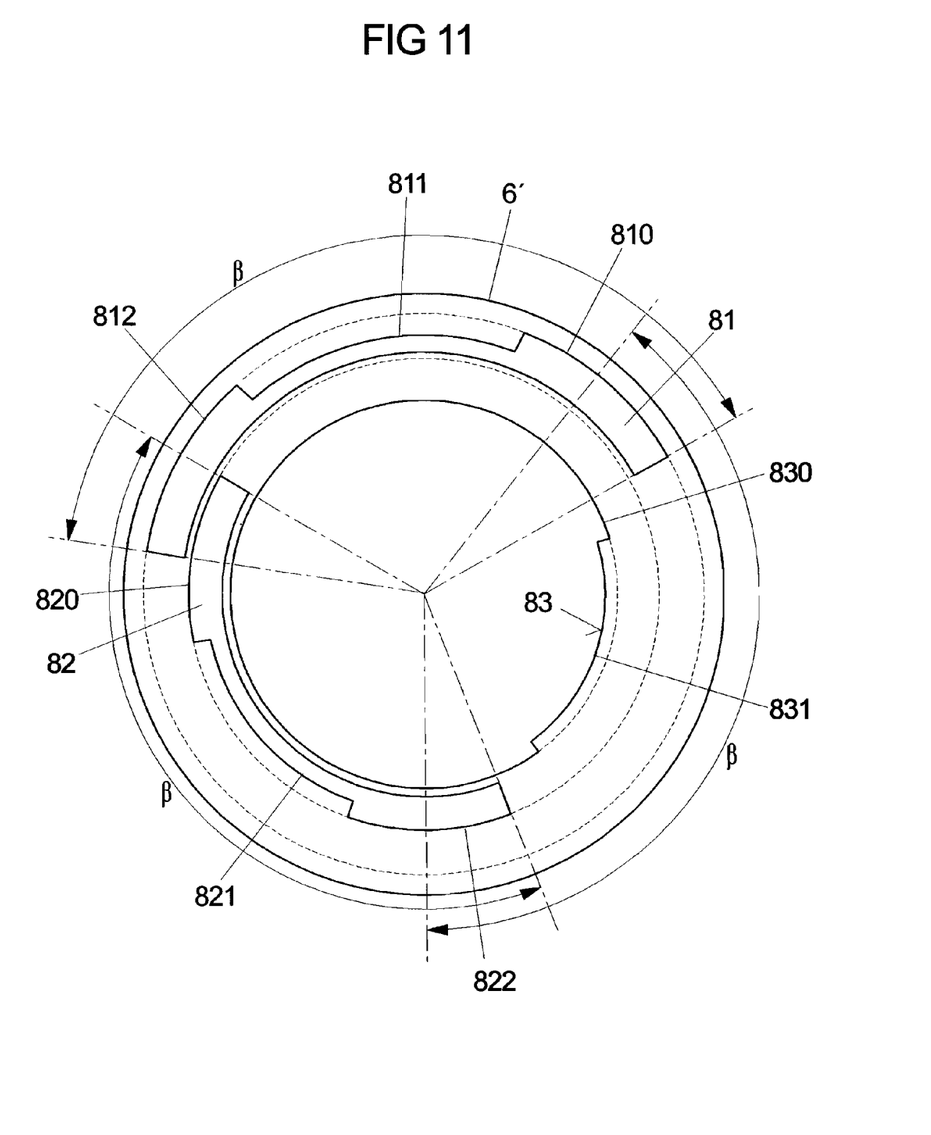
FIG. 11 shows a schematic view of an insert ring with guiding contours arranged thereon and being radially displaced to each other.

In FIG. 11 an embodiment of an insert ring 6' is shown in which three free-pivoting sections 811, 821, 831 that are displaced radially with respect to each other are formed. The insert ring 6' defines three radially displaced guiding contours in the shape of a first oblong hole 81, a second oblong hole 82 and a radially inner edge 83 with sections 810, 811, 812 (oblong hole 81), 820, 821, 822 (oblong hole 82) and 830, 831 (inner edge 83).

The free-pivoting sections 811, 821, 831 lie in the same axial plane, however, are radially displaced to each other such that guiding contours result which describe in each case an angle β larger than 120° and, thus, angularly overlap. The pivoting range of the detent fitting 1, corresponding to the angle β, hence, can be larger than 120° because through the radial displacement of the guiding contours it is prevented that the protrusion of a locking pawl interacting with a guiding contour can run into the guiding contour of another locking pawl.

The idea underlying the invention is not limited to the embodiments described previously.

For example, rather than using insert rings guiding contours may also be molded directly in the second fitting part. Through the molding of the guiding contours, hence, a second fitting part would be provided which individually is adjusted for a respective detent fitting with the desired pivoting range.

Further, it is conceivable to use locking pawls which are arranged on the first fitting part 2 in an unequally spaced manner rather than the equally spaced locking pawls 25a, 25b, 25c according to FIG. 3 and to form protrusions in each case centrally on the locking pawls. Thus, an angular distance between two of the locking pawls of larger than 120° degrees would result.

In addition, it is possible to provide three axially displaced guiding contours by using three insert rings which interact with corresponding protrusions on the three locking pawls.

The invention claimed is:

1. A detent fitting for locking two vehicle parts, comprising:
   a first fitting part;
   a second fitting part which is arranged pivotably about a rotational axis with respect to the first fitting part; and
   three locking pawls which are displaceably mounted on the first fitting part, the locking pawls being configured to be brought in engagement with a toothing of the second fitting part for locking the first fitting part with the second fitting part and configured to be brought out of engagement of the toothing of the second fitting part for releasing the locking, wherein each locking pawl is associated with a free-pivoting section on the second fitting part, the locking pawl interacting with the free-pivoting section when turning the second fitting part relative to the first fitting part and the free-pivoting section configured to prevent an engagement of the locking pawl with the toothing of the second fitting part in a pre-defined angular range, wherein at least one of the free-pivoting sections is displaced in the axial and/or radial direction with regard to the rotational axis with respect to the other free-pivoting sections.

2. The detent fitting according to claim 1, further comprising a pivoting range larger than 120°.

3. The detent fitting according to claim 1, wherein each locking pawl comprises in each case a protrusion projecting in the axial direction, the protrusion configured to interact with the associated free-pivoting section.

4. The detent fitting according to claim 1, wherein each free-pivoting section is formed as a section of a guiding contour arranged on the second fitting part, the section being displaced radially inwards with respect to at least one further section.

5. The detent fitting according to claim 4, wherein the guiding contour is formed through an oblong hole or a radially inner edge on the second fitting part.

6. The detent fitting according to claim 4, wherein the guiding contour defines a pivoting path of the second fitting part relative to the first fitting part in the circumferential direction about the rotational axis.

7. The detent fitting according to claim 4, wherein the guiding contour is formed on an insert ring which is arranged rotationally fixed on the second fitting part.

8. The detent fitting according to claim 4, wherein the guiding contour is integrally formed on the second fitting part.

9. The detent fitting according to claim 1, wherein the free-pivoting sections associated with the locking pawls are displaced with respect to each other in the radial direction with regard to the rotational axis.

10. The detent fitting according to claim 9, wherein the locking pawls comprise protrusions for interacting with the free-pivoting sections which are displaced with regard to each other in the radial direction with respect to the rotational axis.

11. The detent fitting according to claim 1, wherein the free-pivoting sections associated with the locking pawls are displaced with respect to each other in the axial direction with regard to the rotational axis.

12. The detent fitting according to claim 1, wherein two free-pivoting sections are not displaced with respect to each other in the axial and radial direction with regard to the rotational axis, whereas a third free-pivoting section is displaced in the radial direction with regard to the two other free-pivoting sections.

13. The detent fitting according to claim 12, wherein the two first free-pivoting sections comprise an angular distance between their radial middle lines larger than 120° in a circumferential direction.

14. The detent fitting according to claim 12, wherein the third free-pivoting section is displaced in the radial and axial direction with regard to the two other free-pivoting sections.

15. The detent fitting according to claim 12, wherein the two locking pawls, which are associated with the two free-pivoting sections that are not displaced with respect to each other, each comprises a protrusion which comprises an angular distance larger than 120° with respect to each other in a circumferential direction about the rotational axis.

16. The detent fitting according to claim 15, wherein the locking pawls are arranged on the first fitting part with equal angular distance with respect to each other in the circumferential direction about the rotational axis, wherein the protrusions of the two locking pawls which are associated with the two free-pivoting sections that are not displaced with respect to each other each are arranged on the locking pawls offset by an angle about the rotational axis with respect to radially extending middle lines of the locking pawls.

17. The detent fitting according to claim 15, wherein the locking pawls are arranged on the first fitting part spaced unequally in the circumferential direction about the rotational axis, wherein the locking pawls which are associated with the two free-pivoting sections that are not displaced with respect to each other comprise an angular distance larger than 120°, measured between radially extending middle lines of the locking pawls, in the circumferential direction about the rotational axis and the protrusions each are arranged on the middle line of the locking pawls.

18. The detent fitting according to claim 1, wherein a modular element is arranged on a base body of the respective locking pawl for forming a protrusion.

19. The detent fitting according to claim 18, wherein the modular element is formed as a force-fitting part which is force-fitted in a cut-out on the base body of the locking pawl.

20. The detent fitting according to claim 18, wherein the modular element is connectable in different orientations with the base body for forming protrusions arranged differently on the locking pawl.

* * * * *